Oct. 12, 1943.    L. R. BUCKENDALE    2,331,652
BRAKE MECHANISM
Filed April 30, 1941    2 Sheets-Sheet 1

Inventor
Lawrence R. Buckendale
By Strauch & Hoffman
Attorneys

Oct. 12, 1943.　　L. R. BUCKENDALE　　2,331,652
BRAKE MECHANISM
Filed April 30, 1941　　2 Sheets-Sheet 2

Inventor
Lawrence R. Buckendale
By Strauch & Hoffman
Attorneys

Patented Oct. 12, 1943

2,331,652

UNITED STATES PATENT OFFICE 2,331,652

BRAKE MECHANISM

Lawrence R. Buckendale, Detroit, Mich., assignor to The Timken-Detroit Axle Company, Detroit, Mich., a corporation of Ohio Application April 30, 1941, Serial No. 391,183

3 Claims. (Cl. 188—205)

This invention relates to improvements in brake actuating mechanism. In particular, my invention relates to the assembly of a brake actuating camshaft in alignment with its bearings.

Vehicle brake mechanisms of the internal type include a plurality of brake shoes which are expanded within a brake drum attached to a wheel. In the type of actuating mechanism to which my invention is particularly adaptable, the shoes are expanded by a cam, mounted on a shaft which is supported by bearings carried by the backing plate and by a spaced support fixed to an unsprung part of the vehicle. The camshaft generally extends between the backing plate and the spaced support in a direction substantially parallel to the axle or axle housing to which the backing plate is fixed.

In mechanisms of this type, the spaced support may be welded or bolted to the axle or housing itself. In either case, however, the camshaft bearings in the backing plate and in the support must be in exact alignment to prevent binding of the camshaft therein when completely assembled, and in the constructions of the prior art it has been found that after the bracket has been welded or bolted in place, unless extreme care is taken, it is often found that the bearing in the bracket does not exactly align with the bearing in the backing plate. This causes the shaft to bind in its bearings. When the parts are welded in place, for maximum strength, the difficulties of securing proper bearing alignment are increased. During the manufacture of the backing plate and the support, they may be stamped or otherwise formed, and usually have the necessary holes, etc., bored in them before they are welded to the axle or housing. While the customary jigs or other devices may be used to hold them in position during welding, it is extremely difficult to hold them in the exact desired position so that when welded in place they will be properly aligned for the attachment of other parts. It is also necessary to accurately machine the parts. Such proper alignment is particularly necessary in the case of the spaced bearings for the camshaft.

I have found that by providing a clamping means for adjustably clamping the bearing member carried by the support, and permitting rocking of the bearing through a sufficient range to compensate for any misalignment during assembly, the great amount of care involved in properly aligning the parts during welding or otherwise fastening the parts is considerably reduced, since small mislocations of the support can be corrected by properly clamping the bearing after assembly. After assembly, the bearing, which has been properly located in the support to eliminate any binding of the cam shaft, is clamped against further movement, and thereafter under operating conditions both camshaft bearings are thus held in fixed position.

While devices have been heretofore proposed which allow free movement of the camshaft during operation to compensate for lining wear, this introduces an objectionable looseness in the assembly. These objections are not present in an assembly embodying my invention, because after being tightened there is no relative movement of the camshaft bearings in their supports.

It is accordingly a major object of my invention to provide a device facilitating the assembly of a brake mechanism, so that the bearings for the brake operating camshaft can be aligned to eliminate binding of the shaft therein.

Another object is to provide means whereby a bearing for a brake operating camshaft may be adjusted into proper position during assembly to eliminate binding of the camshaft and then be rigidly maintained in that position throughout the life of the brake.

Another object is to provide a vehicle brake assembly including an operating camshaft having one end supported in a backing plate and the other end in a bearing adjustably positioned in a bracket fixed to the axle or housing.

Another object resides in the provision of a novel vehicle brake assembly including a bracket secured to the axle or housing and having actuating mechanism for a camshaft carried by an adjustable bearing clamped to a retaining device secured to the bracket.

It is another object to provide a brake operating assembly including a novel camshaft bearing supporting means and a novel bracket assembly, providing a rigid support for the shaft and yet which permits assembly of the parts without binding, even when they are misaligned during manufacture.

Further objects will become apparent as the specification proceeds in conjunction with the annexed drawings, and from the appended claims.

Figure 1:
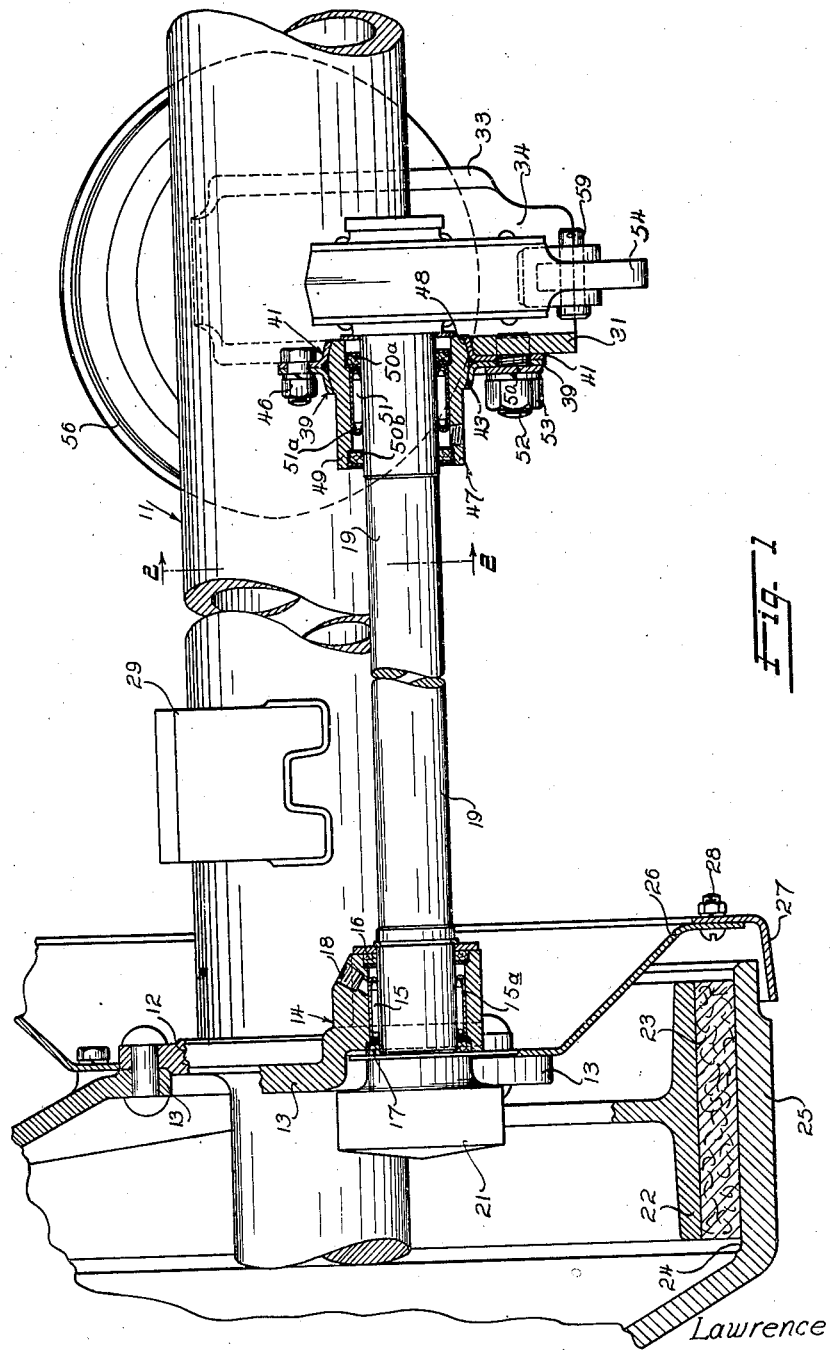
Figure 1 is a rear elevation, partly in section, of a braking apparatus embodying my invention.

In Figure 1 my invention is shown as being applied to a vehicular trailer axle assembly including a hollow axle 11. It is to be understood that the axle 11 may be hollow as shown or of a solid shape on which a non-driving wheel is rotatably mounted, or it can instead be a hollow axle housing, as in the case of a driving wheel.

Adjacent one end, the axle is provided with a flange 12 to which is attached a backing plate 13 which may be riveted to the flange as shown, or otherwise fastened thereto. The backing plate has formed thereon a boss 14 for the reception of a camshaft bearing 15, which is preferably of the needle type, embodying a combined outer race and needle retainer 15a, but it may be a plain bushing if desired. A pair of combined lubricant sealing and bearing retaining assemblies 16 and 17, seated against cooperating shoulders in the boss 14, hold the needle bearing in place. Lubrication may be provided through a nipple received in a threaded opening 18 in the boss.

A camshaft 19 is rotatably supported by the bearing 15 and has a cam 21 fixed on its end portion.

A brake shoe 22 having a lining 23 attached thereto, is operated by the cam 21 and pressed against the inner surface 24 of a brake drum, shown at 25, in well known manner. Each brake shoe may be pivotally supported on an anchor pin, not shown, for movement under control of the cam 21 and the usual retracting spring, not shown.

As will be understood, the brake drum 25 is suitably attached to a hub or other device rotatably mounted on the axle or housing 11 in well known manner. A dish shaped member 26 is attached to the backing plate 13 by suitable means and together with a peripheral flanged member 27, attached by screws 28, excludes dirt and moisture from the enclosed brake shoes and linings.

Suitably affixed to the axle 11 is a saddle 29 for the attachment of the vehicle spring, not shown.

The novel bracket assembly and bearing mount of the invention will now be described.

Figure 3:
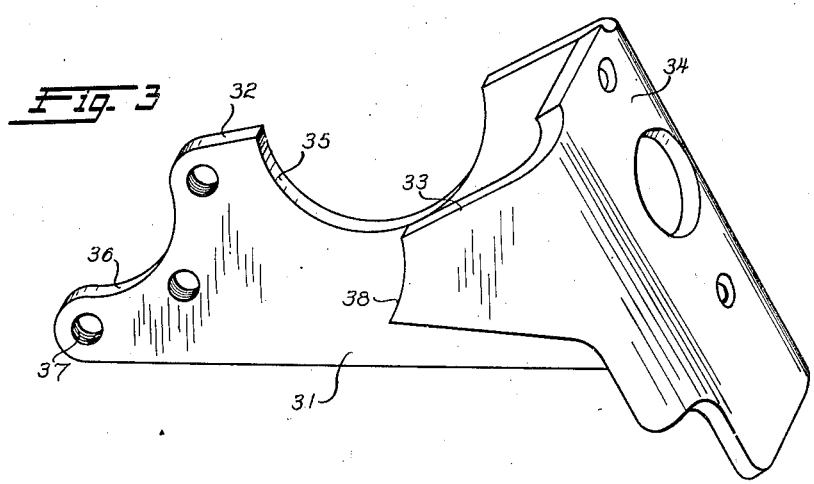
Figure 3 is a perspective view of the bracket shown in Figures 1 and 2 as it appears prior to being affixed to the axle.

At a point remote from the brake housing end of the axle 11 a supporting bracket 31 of special form is welded to the axle. As shown in Figure 3, the bracket is of U-shape, having long and short legs 32 and 33, and a connecting portion 34. The long leg is provided with recesses 35 and 36. A plurality of tapped bolt holes 37 are located adjacent the periphery of recess 36 for a purpose to be described. The short leg 33 is also provided with a recess 38 in alignment with the recess 35. Recesses 35 and 38 are shaped to contact the periphery of the axle 11 at the point where the bracket is attached thereto and preferably have radii of curvature equal to that of the axle.

The bracket 31 is welded to the axle in position so that, when assembled, the two camshaft bearings will be in substantial alignment. By providing two legs and welding them in this manner at the recesses 35 and 38, it is much more rigid and more securely attached to the axle, and is more resistant to breakage than if the short leg 33 were omitted. In order to compensate for misalignment due to inaccurate welding, or to manufacturing inaccuracies in the stamped or machined parts of the assembly, the second camshaft bearing is adjustably attached to the bracket by the novel assembly to be now described.

Figure 4:
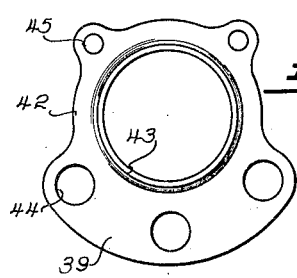
Figure 4 is an elevation of one of the members used to clamp the camshaft bearing to the supporting bracket.

Two similar retainers 39 and 41, one of which is shown in elevation in Figure 4, are attached to the long leg, at the recess 36. Each retainer is stamped or otherwise formed to have a planar circumferential flange 42, and a central flange 43 having a spherical interior surface as shown in Figure 1. Three holes 44 in the flange 42 are so located as to cooperate with the holes 37 in the bracket. Each retainer also has two other holes 45 through which bolts 46 are passed to clamp the upper halves of the retainers together. The two similar retainers are placed opposed to each other so that the two flanges 43 form a spherical seat as shown in Figure 1.

Located within the seat formed by flanges 43 is a sleeve-like camshaft bearing member 47 having an exterior spherical portion 48 and an elongated portion 49. The bearing member 47 is preferably similar to bearing mount 15, containing a series of needle bearings 51 and a combined race and retainer 51a, but it is to be understood that if desired it may be a plain bushing having a spherical exterior portion 48. A pair of combined lubricant and bearing retainers 50a and 50b are provided in the ends of member 47.

Three studs 52 are threaded in the holes 37 in the long leg of the bracket and pass through the matched holes 44 of the retainer members.

A rigid elongated washer or plate 50 having openings aligned with the studs 52 is slipped over the studs on top of the retainer 39. The radii of curvature of surface 48 and the spherical inner surfaces of members 39 and 41 are such that, when nuts 53 are turned up tightly on the studs 52, the retainers will tightly grip member 47 and lock it against rocking or rotational movement. Tightening nuts 53 also clamps the retainers rigidly against the bracket. The washer 50 evenly distributes the pressure of the nuts 53 over the area of the retainers lying between the studs. The bolts 46 are also provided with nuts to fasten the retainers together.

The camshaft extends through the bearings 15 and 47 with the cam 21 projecting into the brake housing and with its other end projecting into the space between the legs 32 and 33 of the bracket.

A camshaft actuating lever arm 54 is clamped on the portion of the camshaft 19 in the space between the bracket legs by a clamping pin or bolt having a head 55. Lock nuts, not shown, are tightened on the bolt to clamp the lever on the camshaft. By loosening the lock nuts and turning the bolt, the lever may be shifted around the camshaft to provide a slack adjustment in well known manner. Details of the construction by which this is accomplished are shown in Patent No. 1,827,946, issued to Mathew B. Morgan on October 20, 1931.

Figure 2:
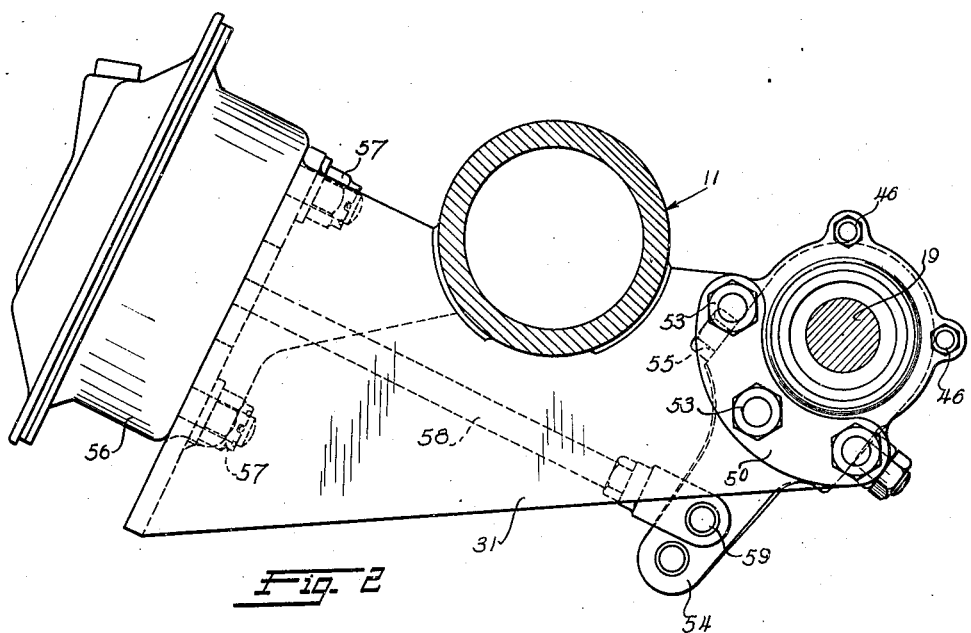
Figure 2 is an elevation, partly in section, taken along the line 2—2 of Figure 1, looking in the direction of the arrows.

The camshaft may be actuated in any suitable manner, but I preferably employ a fluid pressure actuated device carried by the portion of the bracket remote from the camshaft ends. It comprises a housing 56 attached to the portion 34 of the bracket, by means of studs passing through the bracket and having nuts 57 turned up thereon as shown in Figure 2. The housing contains a movable pressure actuated diaphragm or piston actuating the camshaft, and may be actuated by air or hydraulic pressure or by vacuum. A link 58 connects the movable diaphragm with the lever 54 by means of the clevis pin 59.

In operation, the vehicle operator controls the pressure in housing 56 to actuate the diaphragm and rotate the camshaft 19 through the link 58 and lever 54. The cam 21 on the camshaft expands the pivoted brake shoes and lining against the inside of the drum 25 as will be apparent.

The assembly of the mechanism on the axle or housing is greatly facilitated by means of my invention, the assembly operations preferably being carried out as follows: After the bracket 31 is welded in place, the entire camshaft assembly, including the bearing 47 and the retainers 39 and 41, may be slipped into place with the spherical flange of retainer 41 projecting into the recess 36 of the bracket and with the holes 44 in the retainers sliding over the studs 52. The two bolts 46 hold the retainers in mating relationship and also loosely maintain bearing member 47 in place during this operation. Washer 50 and nuts 53 are then placed on the studs and tightened only slightly, so as to allow movement of the bearing 47 in the spherical seat. The bearing 47 is now centered, the slack adjuster, levers and diaphragm installed, and the bearing or bushing is adjusted to avoid any distortion or binding between the camshaft and bearing which is then clamped firmly in place by turning up the nuts 53 on the studs 52. The nuts on the bolts 46 are also turned up securely if they have been left loose during the assembly operation, so that the retainer members are securely fastened together around their entire periphery. When members 39 and 41 have been tightly clamped together, as just described, they preferably tightly grip spherical surface 48 of member 47, so that the bearing member is rigidly gripped in its seat, and no sliding, with attendant wear, can occur. Lever 54 may now be slipped over the end of the camshaft, and the housing 56 placed on the bracket and connected to the lever by the link 58. Final positioning of the lever 54 on the camshaft by means of the slack adjustment is not completed until the brake shoes, drums, etc., are assembled in place. Since members 39 and 41 are located wholly exterior to member 47 and do not overlap the ends, there is no possibility of them contacting the shaft even under conditions of extreme misalignment.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a wheel brake mechanism, an axle structure; a bracket attached to said structure; a brake operating camshaft; a bearing rotatably engaging an end portion of said camshaft; means adjustably positioning said bearing in said bracket for free swiveled movement in any direction during assembly and operable to fixedly hold the bearing against movement when assembled, whereby the camshaft and bearing are held in alignment, and camshaft actuating means mounted on said bracket and connected to said camshaft.

2. A vehicle brake mechanism comprising an axle structure; a brake shoe carried by a backing plate secured to said structure; a bracket having legs connected by a mid-portion, and attached by its legs to said structure; a pair of opposed bearing element retainer members attached to said bracket and having complementary elements forming a recess; a bearing element seated in said recess; means clamping said bearing element against movement in said recess; and a rigid brake operating camshaft having one end portion rotatably carried by said bearing element and the other end portion operably connected to said brake shoe.

3. A vehicle brake mechanism comprising an axle structure; a brake shoe carried by a backing plate secured to said housing; a bracket having legs of unequal length connected by a mid-portion, the bracket being attached to the structure at free end of the shorter leg and a central portion of the longer leg; a pair of opposed bearing retainer members attached to the end of the longer leg and having complementary elements forming a recess; a camshaft bearing member adjustably seated in said recess; means operating to fixedly clamp said bearing member in said recess and a rigid brake camshaft having an end portion rotatably carried by said bearing member and the other end portion operably connected to said brake shoe.

4. A vehicle brake mechanism comprising an axle structure; a bracket attached to said structure and having a substantially planar portion terminating in a recess bordering a plurality of openings in said planar portion; a first substantially planar retainer member provided with a circumferential series of openings, some of which are aligned with the openings in the bracket, and with a central opening bounded by a flange forming a partial spherical socket, the flange projecting into the recess in said bracket; a second retainer member similar to said first retainer member but opposed thereto, whereby the central openings and flanges form a spherical socket; a shaft bearing member having a spherical outer shape seated in said spherical socket; means passing through the aligned openings in the bracket and retainer members for clamping said bearing member against movement; a shaft supported by said bearing member, said shaft being provided with a brake actuating cam at the end remote from said bearing, and with a lever on the end adjacent said bearing for rotating the shaft.

5. A vehicle brake mechanism comprising an axle structure; a bracket having legs of unequal length connected by a mid-portion, the bracket having the free end of its shorter leg and the central portion of the longer leg attached to said structure, the longer leg having a substantially planar portion terminating in a recess bordering a plurality of openings in said planar portion; a first substantially planar retainer member provided with a circumferential series of openings, some of which are aligned with the openings in the bracket, and with a central opening bounded by a flange forming a partial spherical socket, the flange projecting into the recess in said bracket; a second retainer member similar to said first retainer member but opposed thereto whereby the central openings and flanges form a spherical socket; a shaft bearing member having a spherical outer shape seated in said spherical socket; means passing through the aligned openings in the bracket and retainer members for clamping said bearing member against movement; a shaft rotatably supported by said bearing member, said shaft being provided with a brake actuating cam at the end remote from said bearing and with a lever on the end adjacent said bearing member, said lever lying substantially in the plane of the mid-portion of said bracket; a pressure operated actuating means and housing mounted on said mid-portion; and a link connecting said means and lever whereby movement of said actuating means rotates said shaft.

6. In a vehicle brake mechanism, a bracket having a recess in an edge portion; a first retainer member having a spherical flange projecting into said recess; a second retainer member having a spherical flange opposed to the flange of the first member; a plurality of studs projecting from said bracket and through a portion of said retainer members; bolts passing through an opposite portion of said retainer members; a bearing member seated within said spherical flanges; and nuts on said studs and bolts operable to clamp said bearing member between said spherical flanges.

7. In a vehicle brake mechanism, a U-shaped bracket having a long and a short leg and a connecting portion, the legs being provided with aligned recesses to receive an axle; camshaft supporting means on the free end of said long leg; and camshaft actuating means on said connecting portion.

8. In a vehicular wheel brake mechanism, operating mechanism therefor comprising a bracket, means to attach said bracket to an unsprung portion of the vehicle, a lubricated bearing for rotatably supporting a brake actuating camshaft, means forming an external spherical surface on said bearing, a pair of complemental cup-like elements providing an internal spherical surface operable to clamp said bearing to said bracket, a camshaft journalled at one portion in said bearing, bearing means supporting a spaced portion of said camshaft, camshaft actuating means connected to said camshaft, and means supporting said actuating means from said bracket.

LAWRENCE R. BUCKENDALE.